United States Patent
Wilson

(10) Patent No.: US 7,455,462 B2
(45) Date of Patent: Nov. 25, 2008

(54) ZONE TWO FIBER OPTIC CABLE

(75) Inventor: Robert E. Wilson, Palo Alto, CA (US)

(73) Assignee: Avago Technologies Fiber IP (Singapore) Pte. Ltd., Singapore (SG)

(*) Notice: Subject to any disclaimer, the term of this patent is extended or adjusted under 35 U.S.C. 154(b) by 0 days.

(21) Appl. No.: 10/923,582

(22) Filed: Aug. 20, 2004

(65) Prior Publication Data

US 2006/0039655 A1 Feb. 23, 2006

(51) Int. Cl.
*G02B 6/36* (2006.01)

(52) U.S. Cl. .............................. 385/93; 385/79; 385/83

(58) Field of Classification Search .................. 385/74, 385/79, 83, 93, 61, 65
See application file for complete search history.

(56) References Cited

U.S. PATENT DOCUMENTS

| | | | | |
|---|---|---|---|---|
| 4,650,285 A * | 3/1987 | Stevenson | ............... | 250/227.11 |
| 4,666,238 A * | 5/1987 | Borsuk et al. | .................. | 385/79 |
| 5,434,940 A * | 7/1995 | Roff et al. | ...................... | 385/91 |
| 5,467,419 A | 11/1995 | Roff et al. | | |
| 5,526,455 A * | 6/1996 | Akita et al. | ..................... | 385/93 |
| 6,040,934 A * | 3/2000 | Ogusu et al. | ................. | 398/139 |
| 6,493,484 B1 * | 12/2002 | Deri et al. | ....................... | 385/27 |
| 6,550,983 B1 * | 4/2003 | Gilliland et al. | ............... | 385/93 |
| 6,625,351 B2 * | 9/2003 | Cox et al. | ..................... | 385/33 |
| 6,661,951 B1 | 12/2003 | Blair et al. | | |
| 6,694,077 B2 * | 2/2004 | Liu et al. | ....................... | 385/47 |
| 7,068,883 B2 * | 6/2006 | Ludington et al. | ............ | 385/33 |
| 2003/0012513 A1 * | 1/2003 | Ukrainczyk | .................. | 385/61 |
| 2004/0146250 A1 * | 7/2004 | Wakabayashi et al. | ........ | 385/79 |
| 2006/0002667 A1 * | 1/2006 | Aronson | ...................... | 385/93 |

\* cited by examiner

*Primary Examiner*—Charlie Peng

(57) ABSTRACT

A module-to-fiber connection includes a fiber optic module and a fiber optic cable assembly. The fiber optic module includes (1) a ferrule interface having a port for receiving a ferrule, (2) an optoelectronic device such as a light source or a photodetector, and (3) a first lens having a first focus located at the optoelectronic device. The fiber optic cable assembly includes (1) the fiber and (2) the ferrule receiving the fiber. The tip of the ferrule includes a second lens having a second focus located at the tip of the fiber. When the ferrule is inserted into the port, the optical axes of the first and the second lenses are substantially parallel.

14 Claims, 12 Drawing Sheets

ZONE TWO FIBER OPTIC CABLE

DESCRIPTION OF RELATED ART

Fiber optic (FO) cable assemblies typically are designed to be used in a variety of applications and an individual cable assembly is expected to last hundreds of cycles. The term "cable assembly" used herein indicates a fiber optic cable with one or more fibers and connectors installed on one or both ends. The FO cable assemblies are normally covered by industry standards, which assure the cable assemblies work well in a wide variety of applications and reliably over the life of the cable assemblies. As a result, the FO cable assemblies are often over-designed and overly expensive for some applications because they must work for all applications.

FIG. 1 illustrates a partially exploded view of a conventional duplex LC (Lucent connector) cable assembly 10. Typically, a fiber optic cable 12 is stripped of a jacket 14 and a buffer 16 to expose a bare fiber 18. Fiber 18 is inserted through and bonded to a free-floating ferrule 20, which is spring-loaded by a spring 22 inside a connector plug 24 mated to a duplex connector body 26. Ferrule 20 has stringent dimensional requirements. For example, the tolerance of the ferrule diameter must be within about 1 microns ($\mu$m) and the tolerance between the ferrule bore and the ferrule diameter must be within about 1 $\mu$m. The end face of ferrule 20 is highly polished to provide a proper physical contact (PC) surface that minimizes optical loss and back reflection when two fibers come into intimate physical contact. Producing ferrule 20 with these stringent dimensional requirements makes it an expensive part to manufacture.

Fiber 18 is fixed to ferrule 20 so it protrudes from the ferrule tip. The protruding fiber 18 is then scribed and broken off. A crimp ring 28 is then slid onto connector body 26. Kevlar fibers from jacket 14 are feathered around the end of crimp ring 28. A crimp sleeve 30 then physically crimps the Kevlar fibers onto crimp ring 28. A strain relief boot 32 is then slid onto crimp sleeve 30.

The ferrule tip is then polished to provide the appropriate surface characteristics to fiber 18. The polished surface is inspected through a microscope for scratches, voids, and chips. Cable assembly 10 can also be connected to a light source and an optical power meter to check insertion loss and back reflection. If any result is unsatisfactory, the ferrule tip is polished again or scrapped. These steps make cable assembly 10 an expensive part to manufacture.

For engagement and disengagement with a FO module, each connector plug 24 has a latching arm 34 with latching shoulders 36. Connector body 26 has a trigger 38 that simultaneously lowers latching arms 34 of both connector plugs 24. Trigger 38 also protects latching arms 34 from catching onto something and breaking off.

FIG. 2 illustrates a conventional FO module 40. FO module 40 has a nose 42 with two connector receptacles 44 for receiving connector plugs 24. When inserted into connector receptacles 44, latching shoulders 36 (FIG. 1) slide under and then spring up against receptacle shoulders 46 of latch openings 48. To remove cable assembly 10 from FO module 40, trigger 38 (FIG. 1) is depressed to simultaneously lower latching arms 34 (FIG. 1) and disengage latching shoulders 36 from receptacle shoulders 46.

FIG. 3 illustrates a cross-sectional view of the optical interface between cable assembly 10 and FO module 40 when connector plug 24 is inserted into connector receptacle 44. A ferrule interface 62 is located inside nose 42 and has a port 64 that extends into receptacle 44. Port 64 defines a bore for receiving ferrule 20. Ferrule interface 62 also defines lens surfaces 66 and 68 aligned with a light source 70 in FO module 40.

In a zone 1 between light source 70 and lens surface 66, light rays emit from light source 70 and diverge until they impinge lens surface 66. Lens surface 66 then collimates the light rays. Typically, the required tolerance in zone 1 between the placements of light source 70 and lens surface 66 is within about 5 $\mu$m for a typical multi-mode light source.

In a zone 2 between lens surface 66 and lens surface 68, the light rays travel in parallel until they impinge lens surface 68. Typically, the required tolerance in zone 2 between the placements of lenses 66 and 68 is within about 45 $\mu$m.

In a zone 3 between lens surface 68 and the end face of ferrule 20, lens surface 68 converges the light rays at fiber 18 on the end face of ferrule 20. Typically, the required tolerance in zone 3 between the placements of lens 68 and the end face of ferrule 20 is within about 5 $\mu$m for a multi-mode fiber 18 having a 50 $\mu$m diameter core.

It is quite challenging to maintain the light rays at the proper locations in zones 1, 2, and 3, especially over temperature and between the mating of various components. Thus, what is needed is a module-to-fiber connection that reduces the complexity of the existing designs in order to reduce the cost of module-to-fiber connections.

SUMMARY

In one embodiment of the invention, a module-to-fiber connection includes a fiber optic module and a fiber optic cable assembly. The fiber optic module includes (1) a ferrule interface having a port for receiving a ferrule, (2) an optoelectronic device such as a light source or a photodetector, and (3) a first lens having a first focus located at the optoelectronic device. The fiber optic cable assembly includes (1) the fiber and (2) the ferrule receiving the fiber. The tip of the ferrule includes a second lens having a second focus located at the tip of the fiber. When the ferrule is inserted into the port, the optical axes of the first and the second lenses are substantially parallel.

BRIEF DESCRIPTION OF THE DRAWINGS

Use of the same reference numbers in different figures indicates similar or identical elements.

DETAILED DESCRIPTION

The conventional fiber optic (FO) cable assembly is designed to work in fiber-to-fiber applications as well as in module-to-fiber applications. In fiber-to-fiber applications, extreme mechanical precision is needed to successfully align the fibers. Furthermore, a costly termination procedure is needed to prevent back reflection at the fiber-to-fiber interface.

As the design of the cable assembly is complex, the design of the FO module also becomes complex in order to provide the proper interface in module-to-fiber applications. Thus, the requirement for multiple applications creates cable assemblies and FO modules that are more precise and more costly than they might be if the design were optimized for the module-to-fiber interface.

Figure 1:
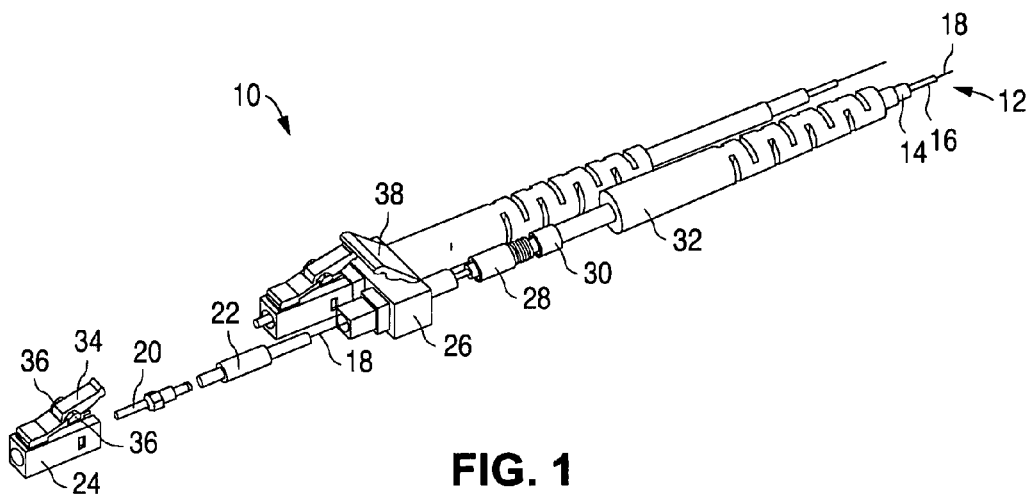
FIG. 1 illustrates an exploded view of a conventional duplex LC cable assembly.
Figure 2:
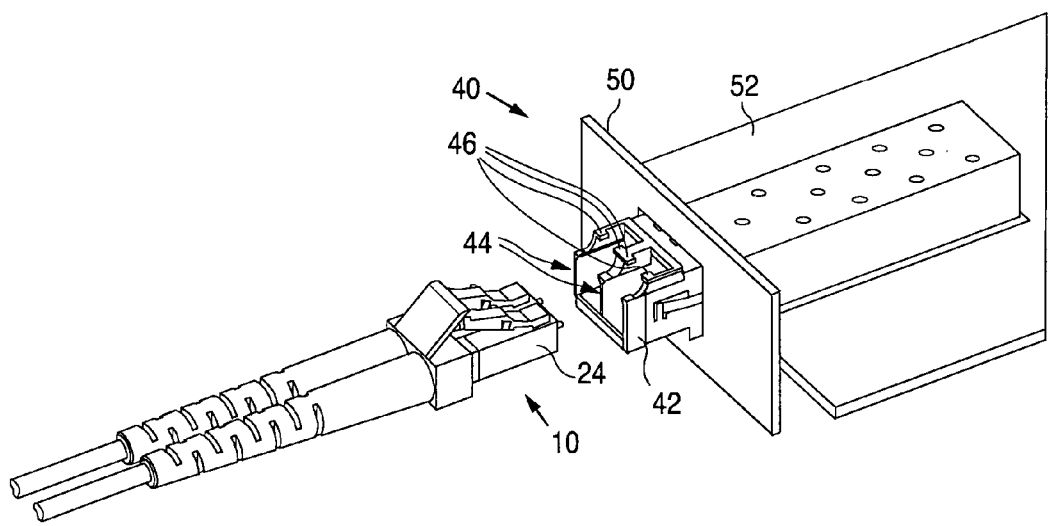
FIG. 2 illustrates a perspective view of a conventional fiber optic (FO) module and the cable assembly of FIG. 1.
Figure 3:
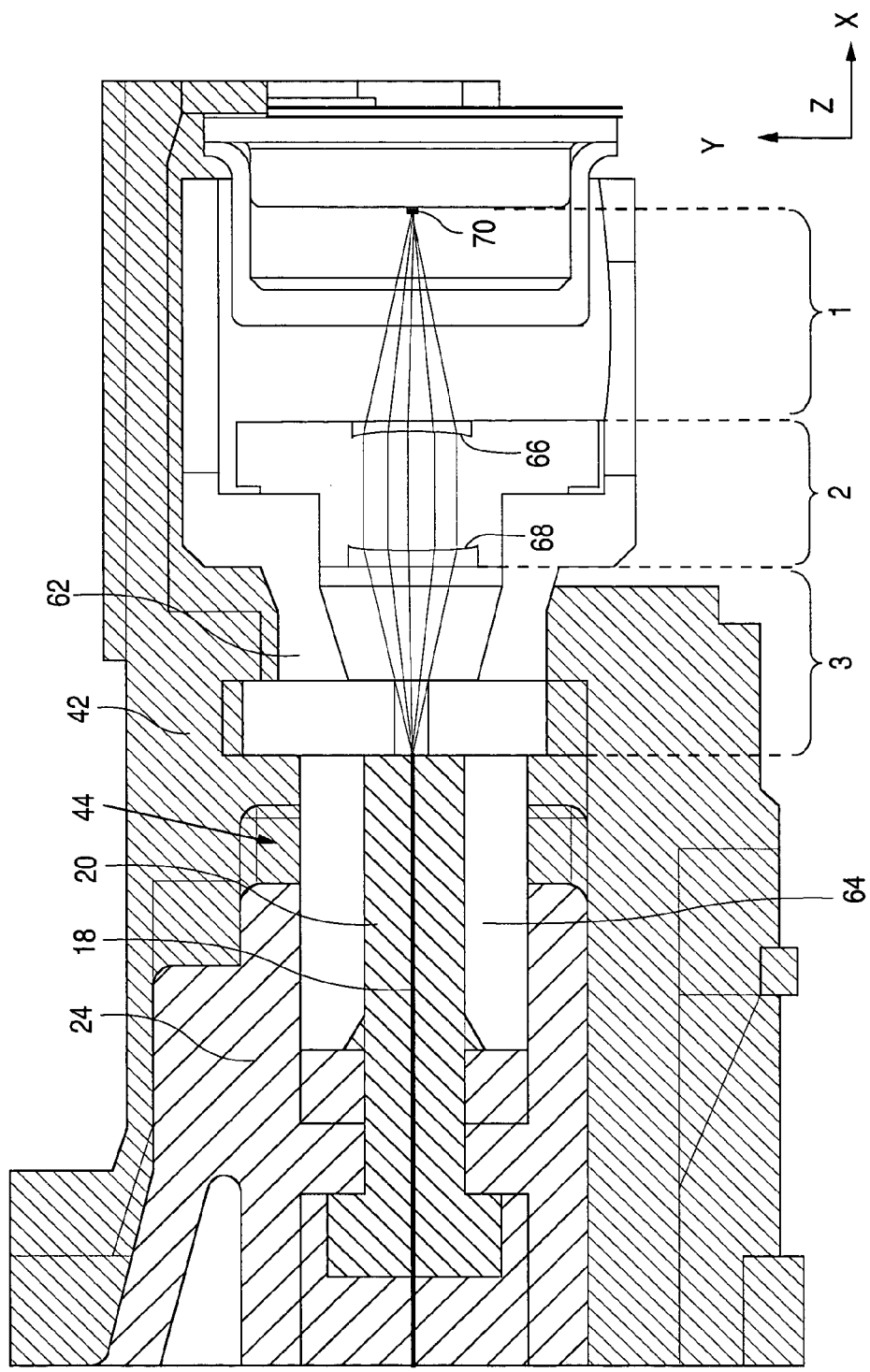
FIG. 3 illustrates a cross-sectional view of a conventional optical interface between the cable assembly and the FO module of FIG. 2.

Referring to FIG. 3, it is noted that the tolerance is much tighter in zone 1 and zone 3 than it is in zone 2. However, the conventional optical interface between FO module 40 and cable assembly 10 is always made in zone 3. In accordance with the invention, the optical interface between a FO module and a cable assembly is now made in zone 2 between the lenses as this is where the tolerances are most forgiving.

Figure 4:
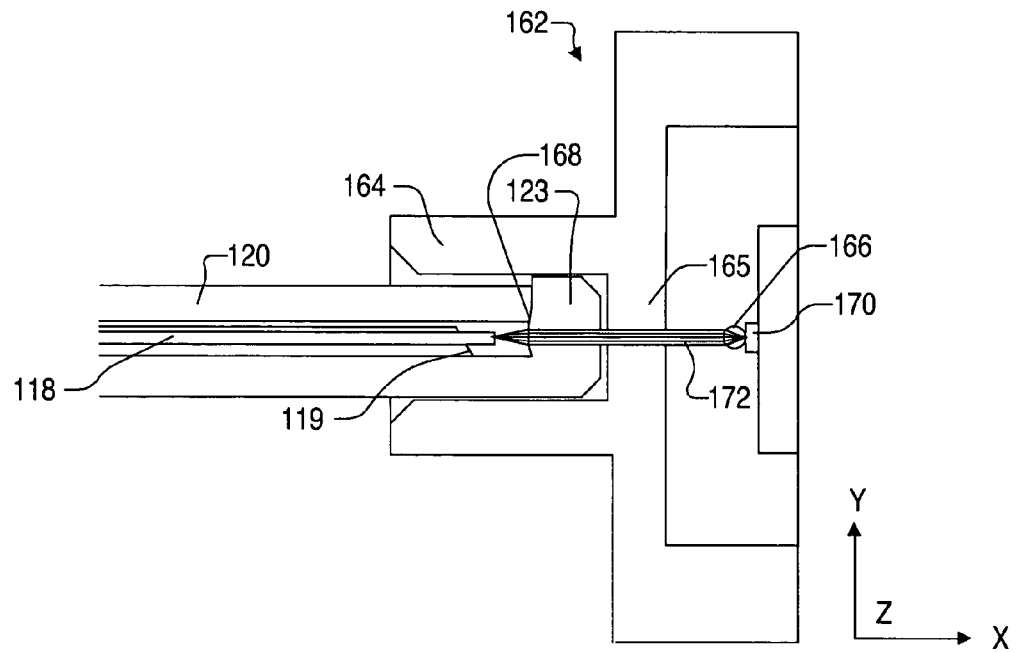
FIGS. 4, 5A, and 5B illustrate cross-sectional views of an optical interface between a zone 2 cable assembly and a FO module in one embodiment of the invention.
Figure 5A:
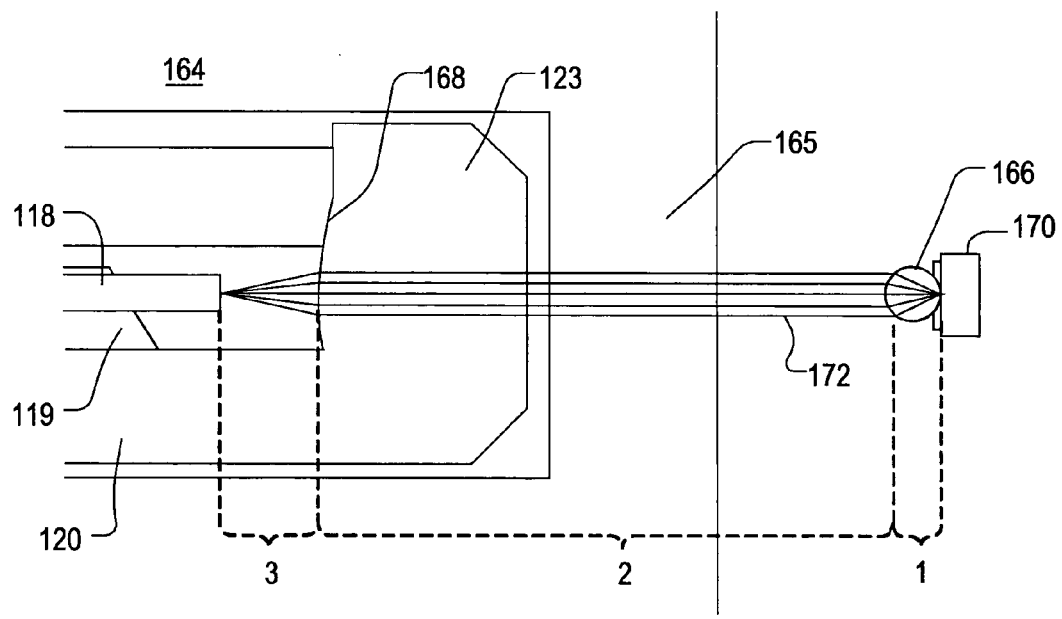

FIGS. 4 and 5A illustrate an optical interface between a "zone 2" cable assembly and a "zone 2" FO module in one embodiment of the invention.

Figure 5B:
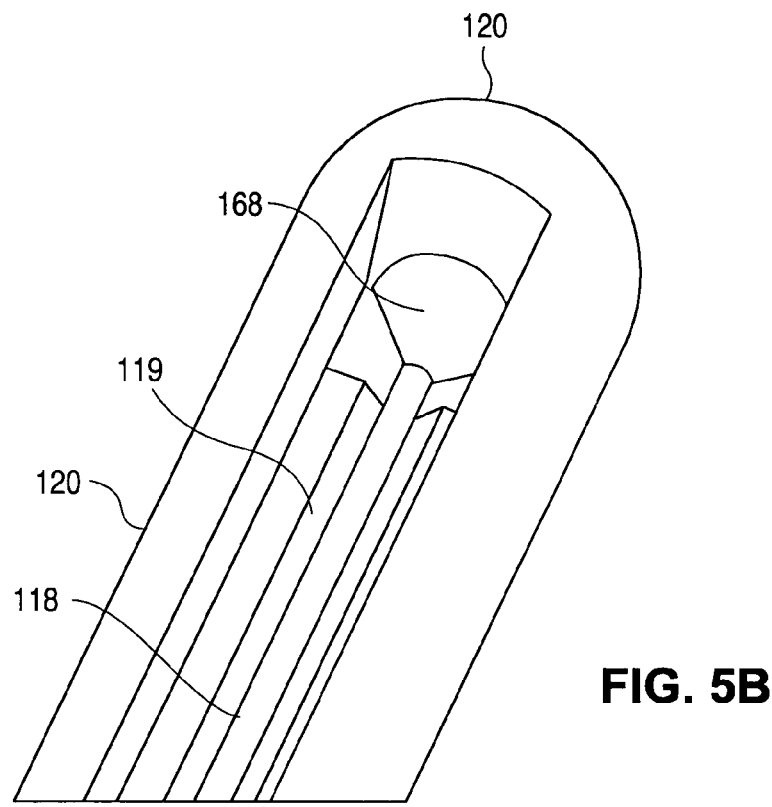

In the cable assembly, a ferrule 120 has a tip 123 whose inner surface forms a converging lens 168. Lens 168 has its focus located at the tip of a fiber 118 seated in a V-groove 119 formed within ferrule 120. The tip of fiber 118 does not need to be polished because there is no physical contact with another fiber in the module-to-fiber connection. As seen in FIG. 5B, fiber 118 in groove 119 can be placed at the proper focal distance form lens 168 by visually inspecting the location from above.

In the FO module, a ferrule interface 162 has a port 164 for receiving ferrule 120. Ferrule 120 is inserted into port 164 so that tip 123 is proximate to a window 165 in ferrule interface 162. The FO module includes an optoelectronic device 170 and a collimating lens 166. Device 170 is a light source such as a vertical cavity surface emitting laser (VCSEL). Lens 166 has its focus located at light source 170.

In operation, diverging light rays 172 emit from light source 170 and enter lens 166. Lens 166 collimates light rays 172 into substantially parallel light rays. Light rays 172 travel through window 165 of ferrule interface 162 and into tip 123 of ferrule 120. When light rays 172 emerge from lens 168, they are converged at the tip of fiber 118.

Conversely, the light path can be reserved in one embodiment where optoelectronic device 170 is a photodetector, lens 168 is a collimating lens, and lens 166 is a converging lens. In this embodiment, diverging light rays 172 emit from fiber 118 and impinge lens 168. Lens 168 now collimates light rays 172 into substantially parallel light rays. Light rays 172 travel through tip 123 and window 165. When light rays 172 reach lens 166, they are converged at photodetector 170.

As can be seen, the optical interface between the FO module and the cable assembly is now in zone 2 between lenses 166 and 168 where the tolerances are most forgiving. The tolerances are most forgiving in zone 2 because, as long as the optic axes of lenses 166 and 168 are substantially parallel, the collimated light rays will reach their respective focuses at device 170 and fiber 118. This allows the alignment of the components along the X, Y, and Z-directions to be relaxed as long as the optical axes of lenses 166 and 168 are substantially parallel.

Making the optical interface in zone 2 allows for looser tolerance on certain dimensions in the cable assembly and the FO module. These dimensions include the diameter of ferrule 120 and the inner diameter of port 164. However, tight tolerance must be maintained for the alignment of V-groove 119 to lens 168, and the alignment of lens 166 to device 170. In one embodiment, ferrule 120 is injection molded to form V-groove 119 and lens 168 from the same mold in order to improve their alignment. In one embodiment, lens 166 may be directly mounted on light source 170 or integrally formed on light source 170 in order to improve their alignment.

Figure 7:
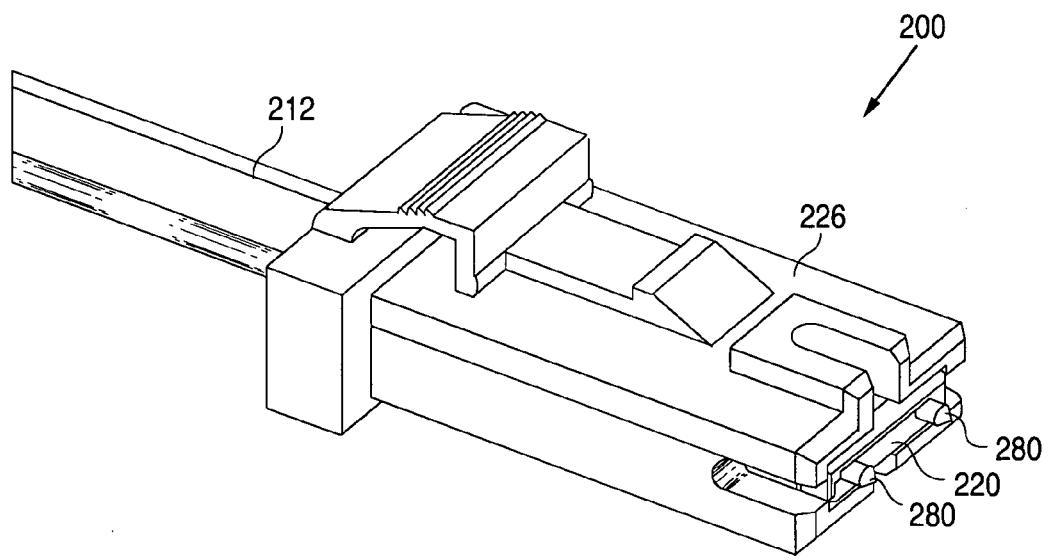
FIGS. 6 and 7 illustrate perspective views of a zone 2 multi-fiber cable assembly in one embodiment of the invention.
Figure 6:
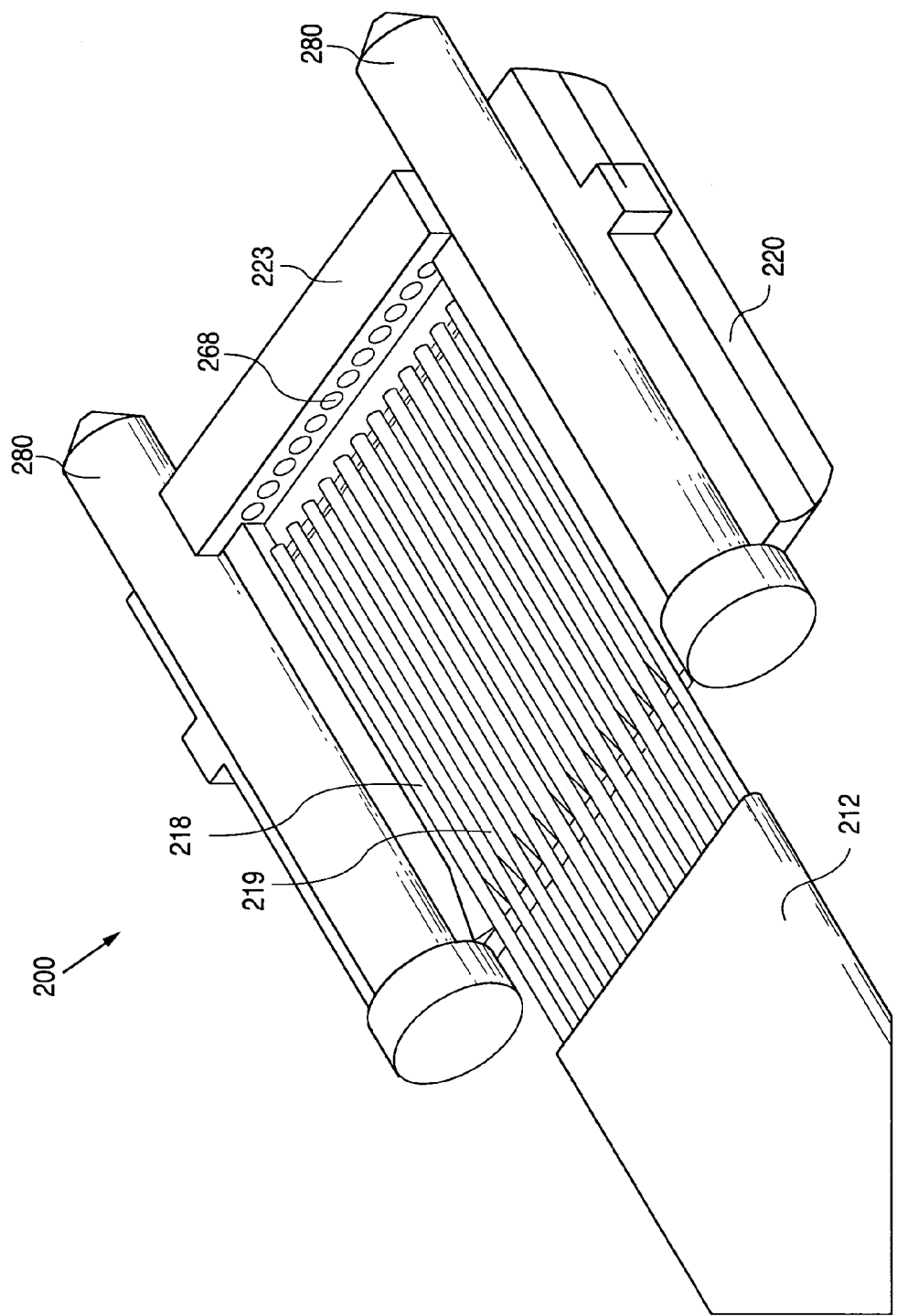

FIG. 6 illustrates a zone 2 cable assembly 200 for multiple-fiber connections in one embodiment of the invention. Cable assembly 200 includes a ferrule 220 having multiple V-grooves 219 (only one is labeled for clarity). Lenses 268 (only one is labeled for clarity) are formed on an inner surface of a ferrule tip 223. A fiber optic cable 212 is stripped to expose multiple fibers 218 (only one is labeled for clarity). Fibers 218 are seated in V-grooves 219 opposite lenses 266 at the proper distance. Ferrule 220 further includes alignment pins 280 formed on opposing sides of fibers 218. Alignment pins 280 are used to align cable assembly 200 to a port in the FO module. FIG. 7 illustrates that a connector body 226 may enclose ferrule 220. Connector body 226 can be any style of connector body needed to mate with the FO module and could be designed in a style similar to LC, MT-RJ, SC, SMA, and ST-type connector bodies.

Figure 8:
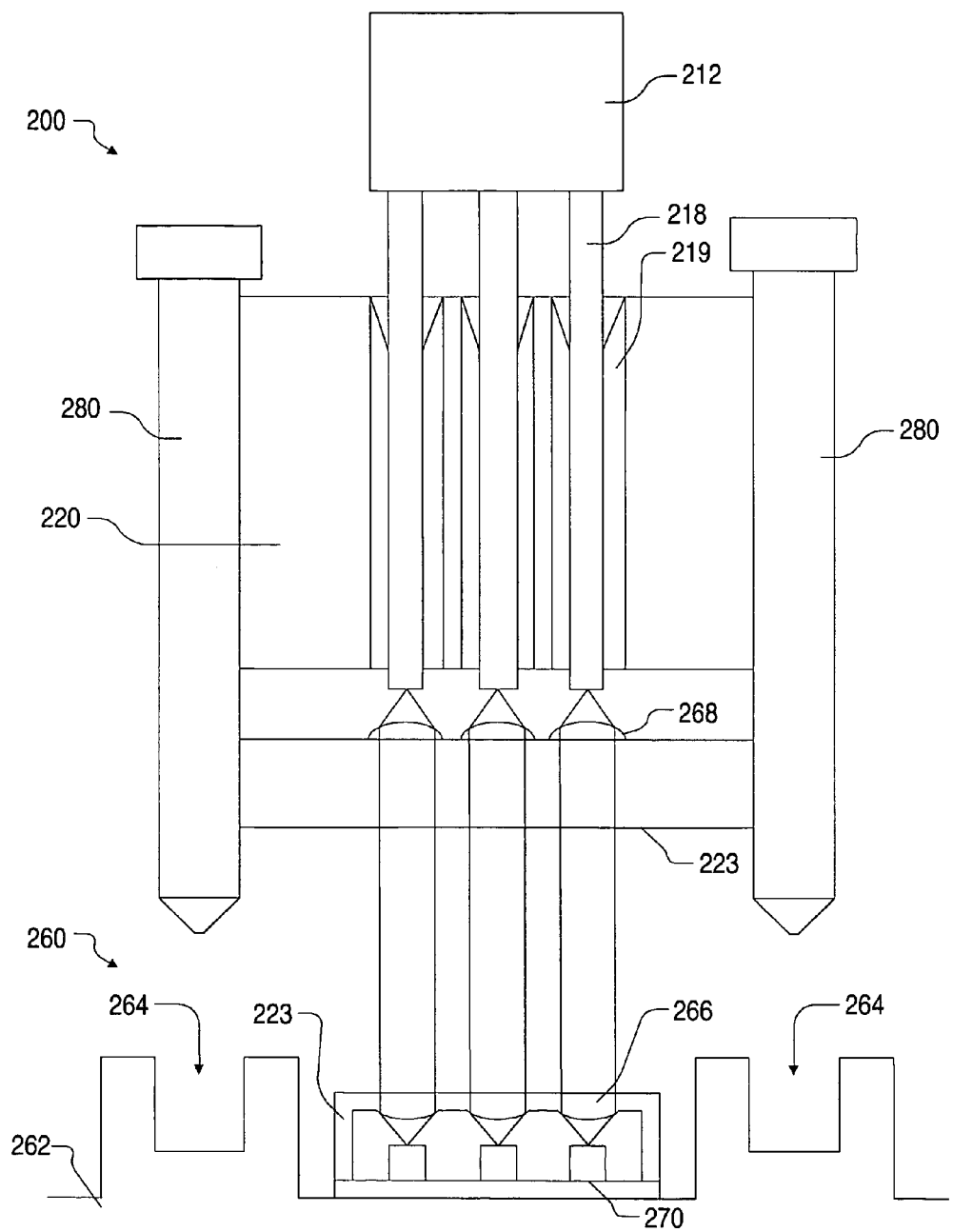
FIG. 8 illustrates a zone 2 multi-fiber cable assembly and a zone 2 multi-fiber FO module in one embodiment of the invention.

FIG. 8 illustrates a multi-fiber FO module 260 in one embodiment of the invention. A ferrule interface 262 defines alignment holes 264 for receiving alignment pins 280. Although not illustrated, ferrule interface 262 includes a port that receives ferrule 223. Multiple optoelectronic devices 270 (only one is labeled for clarity) are located on ferrule interface 262. In one embodiment, optoelectronic devices 270 are enclosed in an optoelectronic package including a lid 223. Lid 223 may have integrated lenses 266 (only one is labeled for clarity) having their focuses located at corresponding devices 270.

When cable assembly 200 is inserted into FO module 260, alignment pins 280 will guide ferrule 223 into ferrule interface 262. Once inserted, lenses 266 and 268 will be aligned for communication between fibers 218 and devices 270.

In one embodiment, one or more optoelectronic devices 270 are light sources. Each lens 266 collimates diverging light from a corresponding device 270 onto a corresponding lens 268. Each lens 268 converges the collimated light onto a corresponding fiber 218.

In another embodiment, one or more optoelectronic devices 270 are photodetector. Each lens 268 collimates diverging light from a corresponding fiber 218 onto a corresponding lens 266. Each lens 266 converges the collimated light onto a corresponding device 270.

Figure 9:
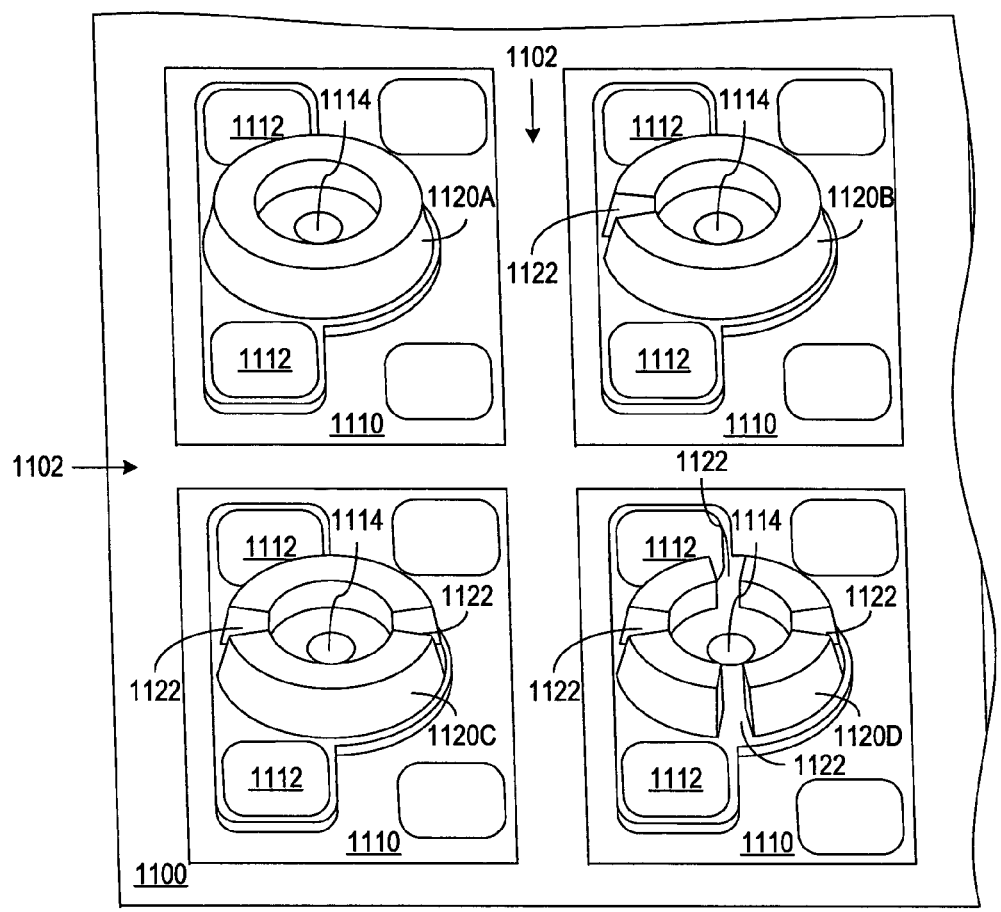
FIG. 9 shows part of a wafer in accordance with an embodiment of the invention containing multiple semiconductor lasers with stand structures for lenses.

FIG. 9 illustrates an embodiment of the invention in which multiple laser diodes 1110 have been formed in and on a wafer 1100. In an exemplary embodiment of the invention, each laser diode 1110 is a vertical cavity surface emitting laser (VCSEL) that can be formed using well-known semiconductor processing techniques. For example, U.S. Pat. No. 6,658,040, entitled "High Speed VCSEL", describes one specific example of a suitable laser diode, but more generally, aspects of the invention can be applied to any laser diode architecture that emits a light beam from a surface of a wafer.

Each laser diode 1110 includes bond pads 1112 for electrical connections and a light emitting area 1114 through which a light beam emerges. Scribe lanes 1102 separate laser diodes 1110 and permit sawing, scribing, or other processing that cuts wafer 1100 into individual dice without damaging the laser diodes 1110.

Standing structures 1120A, 1120B, 1120C, and 1120D (generically referred to herein as structures 1120) surround respective light emitting areas 1114 of each of the laser diodes 1110 for which a lens will be provided. Standing structures 1120A, 1120B, 1120C, and 1120D differ from each other in FIG. 9 to illustrate some of the suitable geometries for structures 1120, but more typically, all of the structures 1120 on a wafer 1100 would be the same for a process fabricating substantially identical devices.

Standing structure 1120A in FIG. 9 is ring-shaped and centered on the emitting area 1114 of the corresponding laser diode 1110. The inner diameter, width, and height of standing structure 1120A will generally depend on the size and optical properties of the lenses to be attached over laser diodes 1110 and may also depend on the material used in standing structure 1120A and on the techniques and structures that form electrical connections to laser diodes 1110. In an exemplary embodiment of the invention where the lens is a ball lens having a diameter of 300 µm, standing structure 1120A can be made of a polymer material such as polyimide, cyclotene, an epoxy, or a photoresist and has an inner diameter of about 60 to 80 µm, a width of about 20 to 40 µm, and a height or thickness of about 20 to 60 µm. One example of a suitable polymer material is Durimide 7520 manufactured by Arch Chemical. Another possible polymer material is SU-8 by MicroChem Corp. Both polymer materials can be dispensed by spinning and patterned by lithographic methods.

Standing structures 1120B, 1120C, and 1120D are similar to standing structure 1120A but have one or more openings 1122 formed through the respective ring walls. Openings 1122 can help control air/adhesive flow in embodiments where an adhesive attaches lenses to structures 1120. In particular, one attachment process coats an optically transparent adhesive on a structure 1120 before setting a ball lens on the structure 1120. For best optical performance, non-uniformities such as irregular air-adhesive interfaces should be excluded from optical path of the laser beam. Accordingly, a cavity formed in structure 1120 between the ball lens and laser diode 1110 is preferably filled with air or with transparent adhesive, and gas bubbles in the adhesive should be avoided where the adhesive is in the optical path. Openings 1122 facilitate filling the cavity in structure 1120 with adhesive without trapping air or gas bubbles. An adhesive such as silicone, which does not introduce significant interface stress, is preferred in embodiments where the adhesive filling the cavity is directly on an active surface of a laser diode 1110.

In an alternative attachment process that provides an air gap between laser 1110 and the lens, openings 1122 prevent thermal expansion of trapped gas from disrupting the attachment of the lens. The size and number of openings 1122 in structures 1120 can be selected as best suited for the particular attachment process employed.

The illustrated standing structures 1120 as described above are primarily ring shaped, and when a ball lens is set on such structure 1120, the seating of the ball lens provides automatic alignment of the ball lens to the underlying laser diode 1110. Other geometries for a standing structure 1120 could also provide automatic alignment when used with a ball lens or another optical element that is shaped to fit in an opening that the standing structure 1120 creates. For example, three or more posts of equal height that are equal distance from the light emitting area 1114 of a laser diode 1110 can hold a ball lens in proper alignment, and such posts can have a variety of shapes, including but not limited to the sections of rings shown in FIG. 9.

As noted above, standing structures 1120 can be formed from a variety of materials, including polymers, metals, and insulators. In an embodiment of the invention using a polymer such as a photoresist, the fabrication of standing structures 1120 begins spinning a layer of photoresist such as SU-8 onto a wafer on which laser diodes 1110 have been fabricated. The thickness of the photoresist layer is selected according to the desired height of standing structures 1120 and would be about 20 to 60 µm for an exemplary embodiment of the invention. A conventional photolithographic process can then expose the photoresist layer to a light pattern of the appropriate wavelength and then develop the photoresist to leave photoresist regions that form standing structures 1120. The photoresist regions can be baked or otherwise hardened to improve the durability of standing structure 1120 if desired.

Alternative embodiments for standing structures 1120 can contain other materials other than polymers. In particular, a metal standing structure 1120 can be formed using an electroplating process. For such a process, a seed coating including adhesion layer of chromium and a top layer of gold can be deposited on wafer 1100. A photoresist mold layer then formed on the seed layer includes openings that expose the seed layer in the areas corresponding to standing structure 1120. An electroplating process can then plate the exposed areas with a metal such as nickel to a desired thickness, e.g., between 20 to 60 µm. The photoresist layer and unplated portions of the seed layer are then removed to leave metal standing structures 1120.

Figure 10:
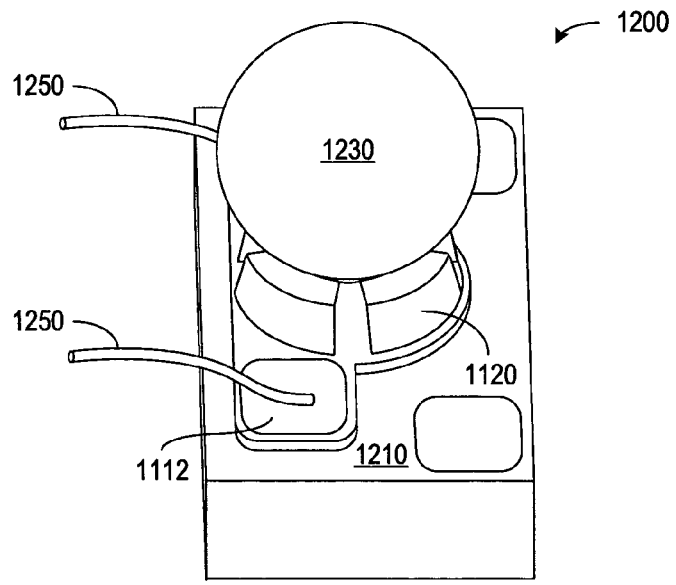
FIG. 10 shows a perspective view of a semiconductor laser chip with an attached ball lens in accordance with an embodiment of the invention.

FIG. 10 shows a device 1200 with a ball lens 1230 attached in accordance with an embodiment of the invention. Device 1200 includes a die 1210 corresponding to one of the laser diodes 1110 on wafer 1100 of FIG. 9. Ball lens 1230 can be a sphere of an optical material such as plastic, glass, or sapphire having a diameter and refractive index, preferably selected to collimate or focus an output beam from the underlying laser diode. Wires 1250 for electrical connections can be attached to bond pads 1112 using conventional wire bonding techniques before the setting of ball lens 1230. However, a low profile or short loop wire bond is preferred to prevent bond wires 1250 from interfering with the placement of ball lens 1230. For example, in an embodiment in which ball lens 1230 has a diameter of about 300 µm and standing structure 1120 has a height of about 38.5 µm and an inner diameter of about 65 μm, bond wires 1250 preferably extend less than about 150 μm above the surface of die 1210 under ball lens 1230.

Ball lens 1230 rests on standing structure 1120, and can be glued in place with an adhesive such as silicone. As mentioned above, an optically transparent adhesive can fill the cavity between ball lens 1230 and the underlying laser diode. Alternatively, adhesive (not shown) can surround ball lens 1230 and/or cap standing structure 1120 leaving an air gap between ball lens 1230 and the underlying laser diode.

Another alternative attachment process coats wafer 1100 first with polyimide and then with a positive resist such as Microposit S1822 manufactured by Shipley. The polyimide layer can thus be non-photoimageable. A lithographic process then patterns the photoresist layer to form a mask and patterns the polyimide using the photoresist mask. The resulting standing structure 1120 includes a polyimide base capped with photoresist. Ball lens 1230 is then placed into the standing structure 1120 either before or after wafer 1100 is cut into dice, and the photoresist remaining atop the polyimide is heated to reflow and permanently retain or attach ball lens 1230 in standing structure 1120.

The above-described processes for attaching ball lenses 1230 to corresponding standing structures 1120 can generally be performed at either the wafer level or the die level. When adhesive is applied, a die level attachment process after wire bonding may be preferred to prevent excess adhesive from interfering with the wire bonding. When reflow of photoresist attaches the lenses, a wafer level process may be preferred unless the attached lenses will interfere with the die separation or wire bonding processes.

The lithographic process that defines the shape and location of standing structures 1120 aligns the standing structures 1120 to laser diodes 1110, and the fit of ball lens 1230 in the cavity in standing structure 1120 aligns ball lens 1230 to standing structure 1120. Further, the spherical symmetry of a ball lens 1230 avoids the need to control the orientation of ball lens 1230. The attachment process is thus relatively simple and inexpensive and provides a high precision alignment (e.g., to with a tolerance less than about 4 μm).

Figure 11:
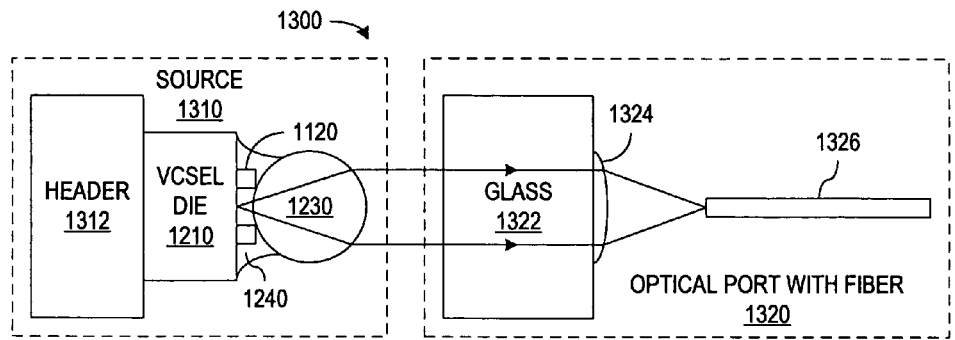
FIG. 11 illustrates a system in accordance with an embodiment of the invention that collimates or adjusts the beam profile of an optical signal to increase alignment tolerances for coupling the optical signal into a fiber optic port.

FIG. 11 illustrates a system 1300 in which an optical signal from an optical source 1310 in accordance with an embodiment of the invention is coupled into an optical fiber 1326 associated with an optical port 1320. System 1300 may, for example, be part of a communication system for transmitting data on a fiber optic network or part of a CD or DVD player or drive.

Optical system 1310 includes a VCSEL die 1210 attached to a header 1312. Header 1312 can be a printed circuit board or a mechanical support structure. Bond wires or other structures (not shown) can electrically connect VCSEL die 1210 to header 1310 or other circuitry (not shown). An adhesive 1240 attaches a ball lens 1230 on a standing structure 1120 that surrounds the emitting area of a laser diode on die 1210. The output beam from the laser diode generally diverges at an angle that is characteristic of the laser diode. Ball lens 1230 decreases the divergence of the output beam and preferably has optical properties (e.g., a focal length) such that the output beam becomes collimated. The separation of ball lens 1230 and the light emitting area of the laser diode is controlled to effect either a collimated beam or a suitable focusing distance.

In the illustrated embodiment, optical port 1320 includes optical elements such as a glass plate 1322 on which a converging lens 1324 is formed, e.g., by reflow of a polymer region, inkjet printing, or molding. Converging lens 1324 focuses the collimated beam from ball lens 1323 onto the end of optical fiber 1316. Alternatively, glass 1322 and lens 1324 can be eliminated, and ball lens 1230 can focus the light beam onto fiber 1326.

The reduced (or ideally eliminated) divergence from source 1310 relaxes the alignment tolerances in system 1300. In particular, efficient coupling of the optical energy from source 1310 can be achieved for a broader range of separations between source 1310 and port 1320.

In accordance with another aspect of the invention, lenses can be formed overlying a laser diode rather than being separately formed and attached to the laser wafer. Formation of the lenses overlying the wafer laser can use a variety of lens forming techniques such as a molding or replication process, a printing method, and surface tension during a reflow of lithographically formed regions. Such lenses generally work best if air gaps or other separations are between the laser diodes and the respective lenses.

Figure 12A:
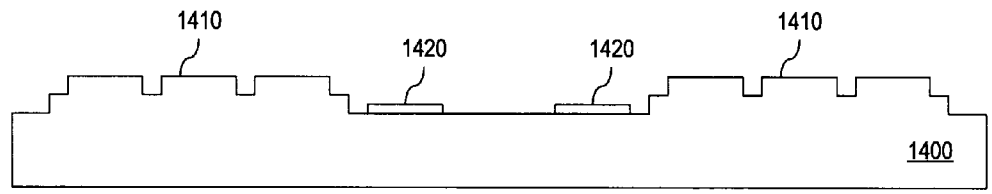
FIGS. 12A, 12B, 12C, and 12D illustrate a process in accordance with an embodiment of the invention that forms a lens array on a lens wafer that is attached to standing structures on a wafer containing laser diodes.
Figure 12B:
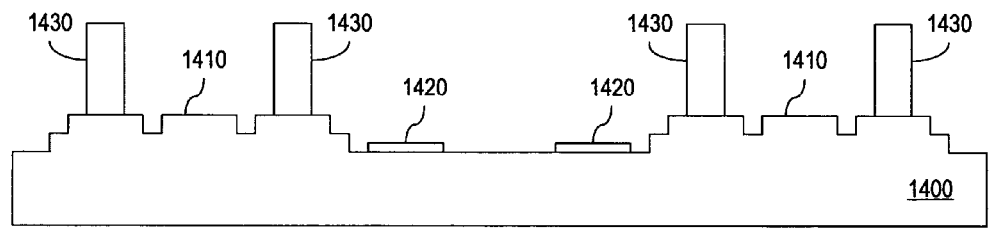
Figure 12C:
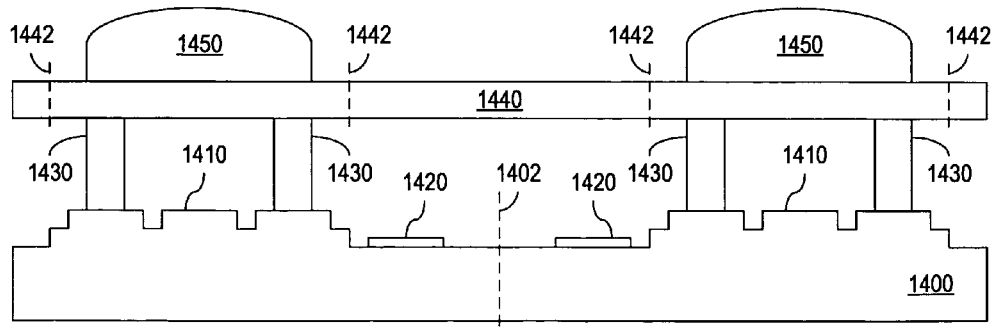
Figure 12D:
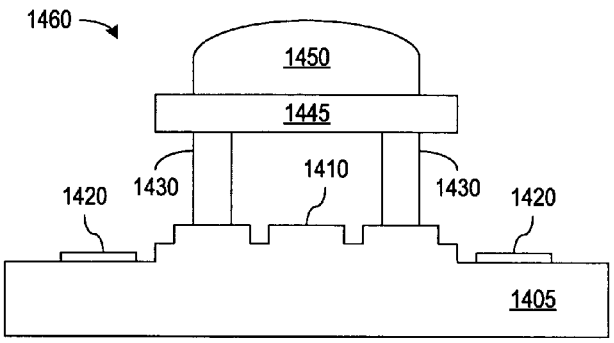

FIGS. 12A, 12B, and 12C illustrate a fabrication process for a device 1460 illustrated in FIG. 12D. Device 1460 includes a lens 1450 overlying an emitting area of a laser diode 1410 in a semiconductor die 1405. Standoffs 1430 and a transparent plate 1445 support lens 1450 and provide a separation between laser diode 1410 and lens 1450. The separation includes an air gap that is between laser diode 1410 and plate 1445 and therefore avoids reliability problems that may be associated with a material interface at the front facet of laser diode 1410. The separation also permits use of a lens 1450 having a more readily achieved focal length and allows space for subsequent wire bonding to pads 1420.

A manufacturing process for device 1460 can begin with fabrication of a wafer 1400 containing multiple laser diodes 1410 as illustrated in FIG. 12A. In an exemplary embodiment of the invention, each laser diode 1410 is a VCSEL that has bonding pads 1420 adjacent to an emitting area of the VCSEL. Wafer 1400 can be fabricated using wafer processing techniques that are well known for manufacturing VCSELs.

A photolithographic process can form standoffs 1430 on wafer 1400 as shown in FIG. 12B. In the exemplary embodiment, standoffs 1430 are made of a photoimageable polyimide or photoresist materials such as SU-8, but other materials such as metals, semiconductors, or insulators could alternatively be used. To form standoffs, the desired material can be deposited on wafer 1400 to a thickness selected according to the desired height of standoffs 1430, e.g., in the range of 10 to 100 μm. After exposure to a desired light pattern, and developing, a standoff 1430 surrounds each laser diode 1410 for which a lens 1450 will be provided. Standoffs 1430 may have any of the configurations of standing structures 1120 of FIG. 9 or may simply be posts of any shape that are near laser diodes 1410.

A lens wafer 1440 is bonded to the tops of standoffs 1430 as shown in FIG. 12C. Lens wafer 1440 is preferably a thin wafer (e.g., about 0.5 mm to 1.5 mm thick) of a material such as glass or quartz that is transparent to the wavelength of light emitted from laser diodes 1410. Lens wafer 1440 can be bonded to standoffs 1430 by spin coating a transparent adhesive material onto the lens wafer surface.

Lenses 1450 are formed on lens wafer 1440 either before or after bonding lens wafer 1440 to standoffs 1430. If lenses 1450 are formed on lens wafer 1440 before wafer bonding, an aligned wafer bonding process is required to align lenses 1450 on lens wafer 1440 to the respective laser diodes 1410 on laser wafer 1400.

A variety of techniques can be used to fabricate lenses 1450 on lens wafer 1440. One technique forms lenses 1450 by lithographically patterning a photoresist layer to create regions of photoresist overlying respective laser diodes 1410 and heating the photoresist regions until the regions melt sufficiently that surface tension creates a curved lens surface. Alternatively, printing process (e.g., ink jet printing) or a molding process (e.g., as described by M. Gale, "Replicated Diffractive Optics and Micro-Optics", Optics & Photonics News, August 2003) could form lenses 1450 on lens wafer 1440. Diffractive lenses can also be formed by methods described by C. David "Fabrication Of Stair-Case Profiles With High Aspect Ratios For Blazed Diffractive Optical Elements" Microelectronic Engineering 53 (2000) 677-680 and U.S. Pat. No. 6,670,105.

Standoffs 1430 in addition to creating air gaps between lasers 1410 and respective lenses 1450 also provides space that permits sawing lens wafer 1440 along scribe lanes 1442 and sawing laser wafer 1410 along scribe lanes 1402. Bonding pads 1420 on the individual devices 1460 thus separated as illustrated in FIG. 12D are accessible for wire bonding.

Figure 13A:
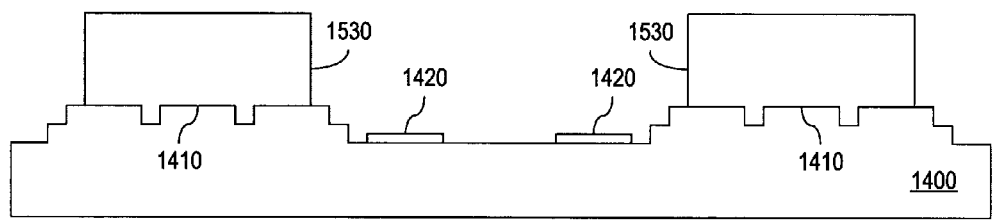
FIGS. 13A, 13B, and 13C illustrate a wafer level process in accordance with an embodiment of the invention that forms lenses on standoffs overlying laser diodes.
Figure 13B:
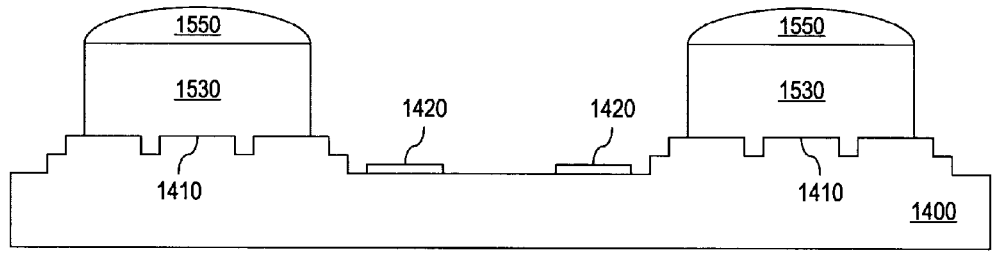
Figure 13C:
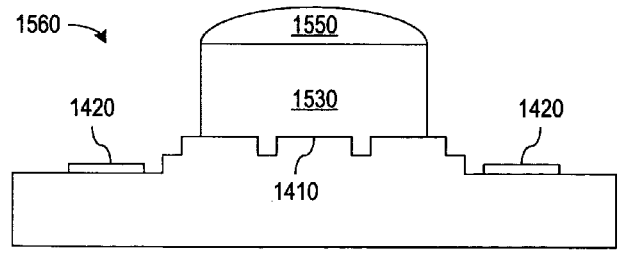

FIGS. 13A, 13B and 13C illustrate a process for fabrication of a device 1560 (FIG. 13C) in accordance with another embodiment of the invention. This fabrication process begins with the laser wafer 1400 of FIG. 12A and forms standoffs 1530 directly on respective laser diodes 1410. A conventional photolithographic process can form standoffs 1530 of an optically transparent material such as polyimide or SU-8 having a thickness sufficient to provide a desired separation between laser diodes 1410 and lenses 1550. A lens fabrication process forms refractive or diffractive lenses 1550 directly on standoffs 1530 as shown in FIG. 13B so that bonding of a lens wafer is not required. In an exemplary embodiment, a non-contact inkjet printing method can to be used to form lenses 1550. In this method, a liquid UV curable material can be jetted onto the top of the standing structure 1530. The liquid will flow across the top of the standing structure 1530 but is held in by surface tension at the edge of the standing structure 1530. Surface tension will also create a spherical surface for the UV curable material. Curing of the liquid material forms a solid refractive lens 1550. After lens formation, sawing of wafer 1400 separates individual devices 1560 such as illustrated in FIG. 13C.

Standoffs 1530 of FIGS. 13A to 13C differ from standoffs 1430 of FIG. 12B in that standoffs 1530 overly the front facets of laser diodes 1410 and have an area that is at least as large as the lenses. Accordingly, device 1560 does not have air gaps over the front facets of laser diodes 1410. Concerns associated with interface stress at the front facets of the laser diodes can be addressed through choice of a standoff material that minimize the stress and/or use of a lower operating temperature for the laser diodes 1410.

Figure 14A:
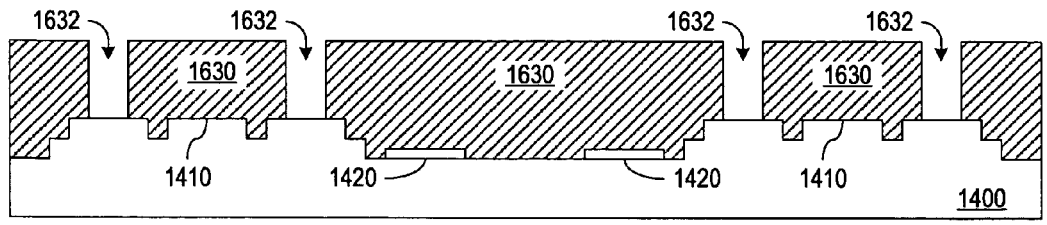
FIGS. 14A, 14B, 14C, and 14D illustrate a wafer level process in accordance with an embodiment of the invention that removes a sacrificial layer to create air gaps between a laser wafer and lenses formed by a replication process.

FIGS. 14A to 14D illustrate a fabrication process using a sacrificial layer 1630 that can be removed to create air gaps between laser diodes 1410 and respective lenses 1640. The fabrication process begins as illustrated in FIG. 14A with formation of a patterned sacrificial layer 1630 on laser wafer 1400 of FIG. 12A. Sacrificial layer 1630 can be formed from a photoresist material having a thickness desired for the height of the standoffs and has openings 1632 in areas where standoffs are desired.

Figure 14B:
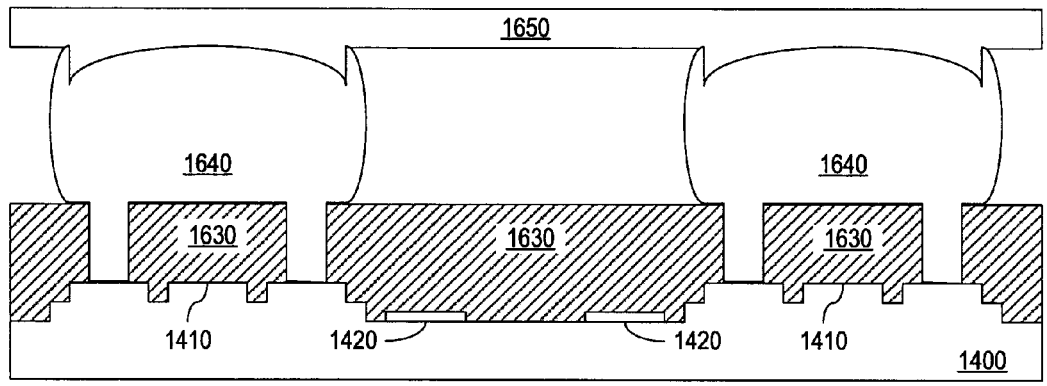

A lens layer 1640 of a material such as a UV curable epoxy is deposited to fill openings 1632 in sacrificial layer 1630 and further to have a thickness above sacrificial layer 1630 that is sufficient for a molding process, e.g., about 200 µm thick. The lens layer is patterned as shown in FIG. 14B to create separate regions above respective laser diodes 1410 and to expose portions of sacrificial layer 1630 above electrical contacts 1420 of laser diodes 1410. Portions of lens layer 1640 that extend into openings 1632 will form standoffs for the lenses.

Figure 14C:
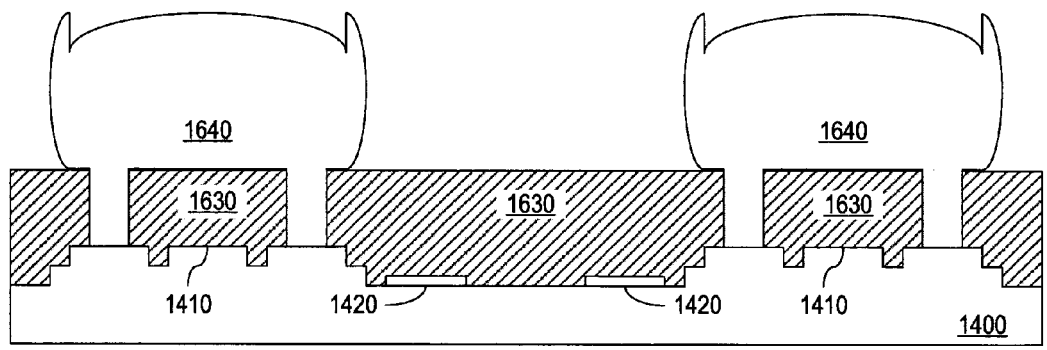

A replication process can then mold the top surface of lens layer 1640 as required to form refractive or diffractive lenses. As shown in FIG. 14B, a wafer sized mold 1650 can be applied to lens layer 1640 to shape lens layer 1640 as required to form the desired lens surfaces. Generally, the replication process can employ a variety of techniques to impress the desired contours on lens layer 1640. One technique is a hot embossing process that heats mold 1650 to a temperature sufficient for deformation of lens layer 1640 and then cools the lens layer 1640 to retain the embossed shape. Alternatively, mold 1650 can be applied when lens layer 1640 is in a malleable uncured state, and curing (e.g., using UV curing) hardens lens layer 1640 while mold 1650 is in place. FIG. 14C shows the structure after removal of mold 1650.

Figure 14D:
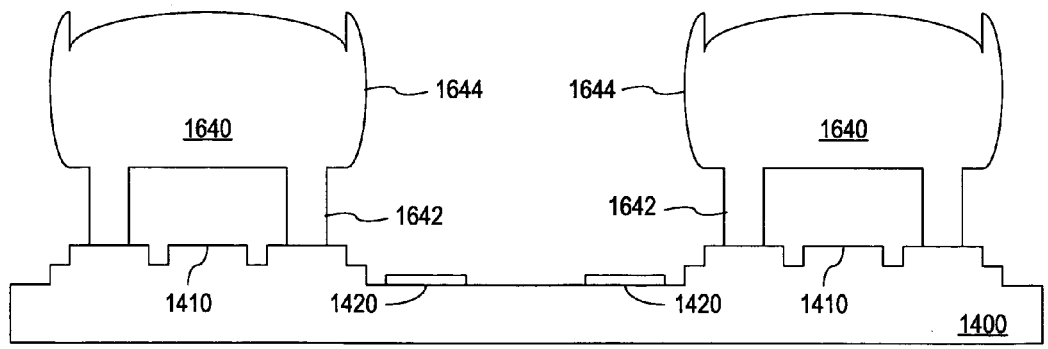

A selective etch can remove sacrificial layer 1630 and leave lens layer 1640 including standoffs 1642 and lens bodies 1644 as shown in FIG. 14D. The process of FIGS. 14A to 14D removes sacrificial layer 1630 after formation of lens surfaces on lens layer 1640, but the order of processing steps could be changed. Standoffs 1642, which where formed from the portions of lens layer 1640 in openings 1632, support lens bodies 1644 while providing air gaps between laser diodes 1410 and respective lens bodies 1644. Conventional sawing or another process can cut laser wafer 1400 into individual dice (not shown).

Figure 15A:
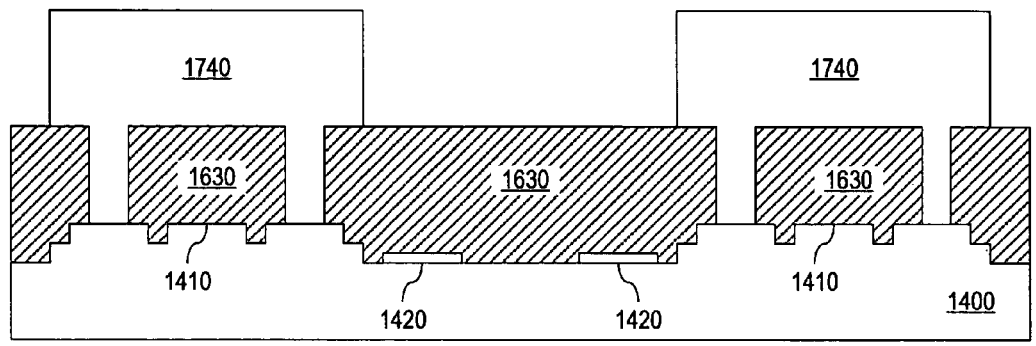
FIGS. 15A, 15B, and 15C illustrate a wafer level process in accordance with an embodiment of the invention that removes a sacrificial layer to create air gaps between a laser wafer and lenses formed by inkjet printing.
Figure 15B:
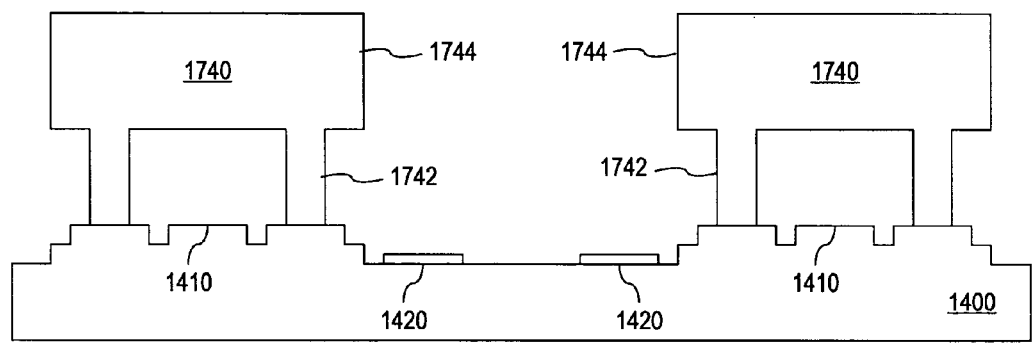
Figure 15C:
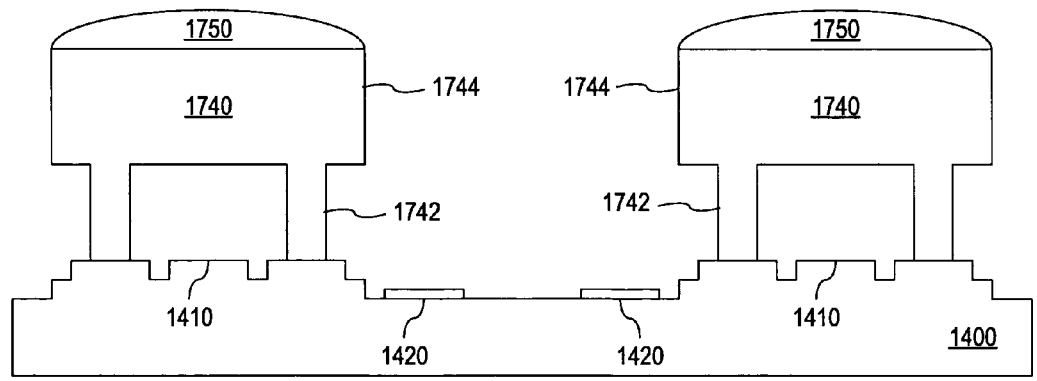

FIGS. 15A to 15C illustrate another process using a sacrificial layer 1630 for support during lens fabrication and removal of sacrificial layer 1630 to create air gaps. The process of FIGS. 15A to 15C can begin with the structure of FIG. 14A including a laser wafer 1400 on which sacrificial layer 1630 has been formed as described above. A lens support layer 1740 is then deposited to fill openings 1632 in sacrificial layer 1630 and to extend above sacrificial layer 1630 by a desired height. Lens support layer 1740 can be made of polyimide, SU-8, or any other material that is optically transparent and permits selective etching to remove sacrificial layer 1630 while lens support layer 1740 remains substantially intact. As shown in FIG. 15A, lens support layer 1740 can be patterned to expose portions of sacrificial layer 1630 for subsequent selective etch process that removes sacrificial layer 1630. FIG. 15B shows the remaining lens support layer 1740, including standoffs 1742 and support areas 1744, after removal of sacrificial layer 1630.

A lens formation process forms lenses 1750 on top of lens support layer 1740 as shown in FIG. 15C. In an exemplary embodiment of the invention, a printing operation such as inkjet printing deposits lens material on support areas 1744 as required to build up lenses 1750. Inkjet printing of UV curable material can be performed as described above in regard to the process of FIGS. 13A to 13C. Since the printing process does not apply significant heat or pressure to support areas 1744, refractive lenses 1750 can be fabricated using this technique after removal of sacrificial layer 1630. However, alternative ordering of the processing steps are also possible.

Figure 16A:
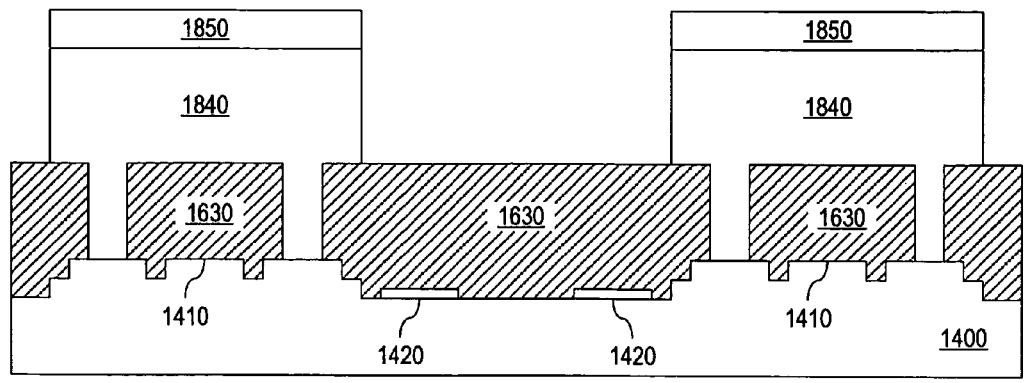
FIGS. 16A, 16B, and 16C illustrate a wafer level process in accordance with an embodiment of the invention that removes a sacrificial layer to create air gaps between a laser wafer and lenses formed by a reflow process.
Figure 16B:
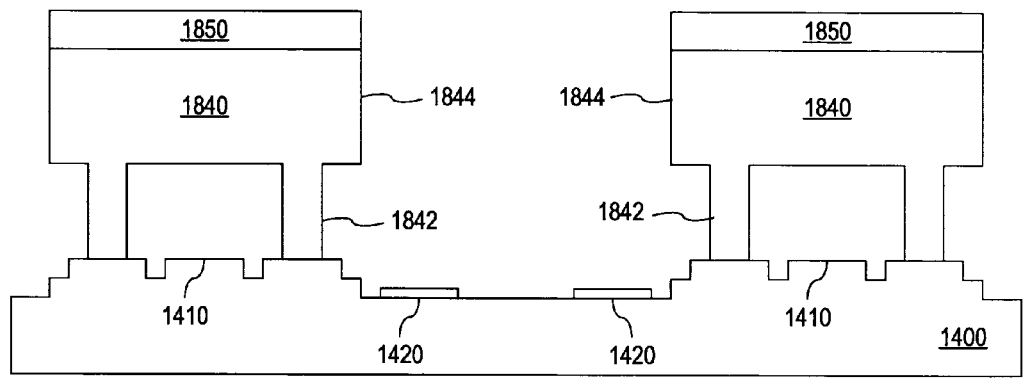
Figure 16C:
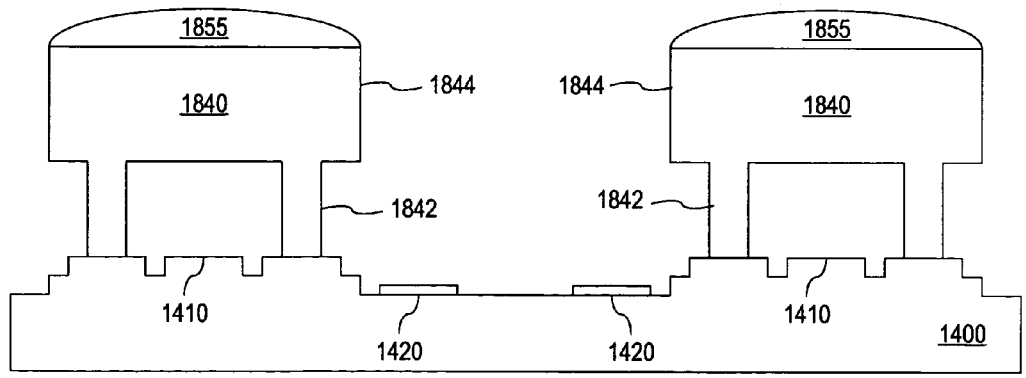

FIGS. 16A to 16C illustrate yet another device fabrication process using a sacrificial layer 1630. This embodiment of the invention can begin with fabrication of laser wafer 400 with overlying sacrificial layer 1630 as shown in FIG. 14A. A lens support layer 1840 of a material such as polyimide or SU-8 is then deposited to fill openings 1632 in sacrificial layer 1630 and to overlie sacrificial layer 1630. As shown in FIG. 16A, lens support layer 1840 can be patterned using a photoresist mask 1850 to expose portions of sacrificial layer 1630. The same process can be used to pattern lens support layer 1740 of FIG. 15A, but for the process of FIGS. 16A to 16C, photoresist mask 1850 is left on lens support wafer 1840 rather than being stripped off after removal of exposed portions of lens support layer 1840.

Sacrificial layer 1630 is removed as shown in FIG. 16B to leave mask 1850 and lens support layer 1840 including standoffs 1842 and lens support areas 1844. The photoresist material that forms mask 1850 should differ from the photoresist material that forms sacrificial layer 1630 to avoid removal of mask 1850 during removal of sacrificial layer 1630. One embodiment of the invention uses a negative resist material such as NR9-8000P from Futurex as the sacrificial material 1630, and Durimide 100 from Arch Chemical as the standoff material 1840. A positive photoresist such as S1822 from Shipley can be used as the mask 1850 to pattern and develop standoff material 1840. After standoff material 1840 is patterned, a negative resist stripper RR4 from Futurex can remove the sacrificial layer 1630.

After removal of sacrificial layer 1630, lenses 1855 can be formed on lens support areas 1844 by heating mask 1850 to a temperature at which regions of mask 1850 liquefy. Surface tension then creates a convex lens contour that remains after mask 1850 cools.

Various other adaptations and combinations of features of the embodiments disclosed are within the scope of the invention. Numerous embodiments are encompassed by the following claims.

What is claimed is:

1. A module-to-fiber connection, comprising:
    a fiber optic module and a fiber optic cable assembly, the fiber optic module comprising a ferrule interface having a port for receiving a ferrule from a fiber optic cable assembly, a window, an optoelectronic device directed at the window, and a first lens in contact with a structure that separates the first lens from a die supporting the optoelectronic device, the first lens having a first focus located at the optoelectronic device, the first lens, structure and optoelectronic device forming a void; and
    the fiber optic cable assembly, comprising:
        a fiber having a termination surface; and
        a ferrule comprising an injection molded piece defining (1) a groove for receiving the fiber and (2) a tip extending beyond the groove along the optical axis, the tip having a rearward directed curved second lens on a surface of the ferrule, the second lens having a second focus located at the termination surface of the fiber, wherein optical axes of the first and second lenses are substantially parallel when the ferrule is inserted into the port, an air gap separates the termination surface of the fiber and the rearward directed curved second lens, and light being substantially collimated between the first and second lenses.

2. The module-to-fiber connection of claim 1, wherein the ferrule defines a cutout for visually aligning the fiber to the lens.

3. The module-to-fiber connection of claim 1, wherein:
    the first lens is selected from the group consisting of (1) a collimating lens that collimates diverging light from the optoelectronic device to the fiber optic cable assembly, and (2) a converging lens that converges light from the fiber optic cable assembly onto the optoelectronic device; and
    the second lens is selected from the group consisting of (1) a converging lens that converges collimated light from the fiber optic module to the termination surface of the fiber, and (2) a collimating lens that collimates light from the termination surface of the fiber into the fiber optic module.

4. The module-to-fiber connection of claim 1, wherein the fiber optical cable assembly further comprises a connector body enclosing the ferrule.

5. The module-to-fiber connection of claim 4, wherein the connector body comprises pins for aligning the fiber optic cable assembly to the fiber optic module.

6. The module-to-fiber connection of claim 1, wherein the structure is arranged to support the first lens.

7. The module-to-fiber connection of claim 6, wherein the structure arranged to support the first lens comprises an opening in a wall to permit the flow of an adhesive.

8. The module-to-fiber connection of claim 6, wherein the structure arranged to support the first lens is ring shaped.

9. The module-to-fiber connection of claim 6, wherein the structure arranged to support the first lens is constructed of a material selected from a polymer, a metal and an insulator.

10. The module-to-fiber connection of claim 6, wherein the structure arranged to support the first lens defines a cavity interposed between the first lens and the optoelectronic device.

11. The module-to-fiber connection of claim 10, wherein the cavity is filled with a transparent adhesive.

12. The module-to-fiber connection of claim 6, wherein the structure arranged to support the first lens comprises a polyimide base capped with a layer of photoresist.

13. The module-to-fiber connection of claim 6, wherein the first lens comprises a spherical lens.

14. The module-to-fiber connection of claim 6, wherein the first lens is formed in alignment with the optoelectronic device on a wafer.

* * * * *